Patented Mar. 28, 1944

2,345,191

UNITED STATES PATENT OFFICE 2,345,191

TREATMENT OF PIGMENTS

Frederick Gage, Akron, Ohio, assignor to Pittsburgh Plate Glass Company, Pittsburgh, Pa., a corporation of Pennsylvania No Drawing. Application April 9, 1942, Serial No. 438,213

6 Claims. (Cl. 106—306)

This invention relates to the preparation of finely divided carbonates of the alkaline earth metals and particularly to the preparation of finely divided calcium carbonate. In general, these carbonates have been prepared by precipitation from solutions or suspensions of alkaline earth hydroxides or salts thereof by carefully controlled methods of precipitation. Thus, finely divided aqueous slurries of calcium carbonate have been prepared by interacting calcium hydroxide or calcium chloride with an alkali metal carbonate or by treating a calcium hydroxide slurry with carbon dioxide at a temperature below 50° C.

The finely divided carbonate which is prepared in this manner may be recovered by filtration. This filtered product, however, contains a large portion of water which must be removed in order to permit the use of the product for pigmentary purposes, particularly for incorporation in rubber compositions. If the filtered product is dried without further treatment, it is noted that the carbonate particles agglomerate to an undesirable degree. Accordingly, it has been the practice to incorporate a coating agent, such as coconut oil, in the product prior to final filtration. The product thus dried is found to be exceedingly fine and free from agglomerates. This process is found to involve considerable expense in view of the fact that at least 2 to 2½ percent of oil is generally found to be essential for this purpose in order to insure the production of a sufficiently soft unagglomerated material.

Attempts have been made by the applicant to use tall oil as a coating agent in lieu of coconut oil. However, such oil has not been used commercially for this purpose since it gives irregular results. Thus, its use often results in a sticky highly agglomerated product which is unsuited to use, for example, as a rubber reinforcing pigment.

In accordance with the present invention it has been found that the agglomeration of calcium carbonate during drying may be prevented and a finely divided product capable of yielding uniformly good results may be secured by adding tall oil to the calcium carbonate at an elevated temperature. Thus, it is found that if the tall oil is incorporated at room temperature an unsatisfactory product is obtained. However, if it is incorporated at a temperature above 50° C., and preferably at least 60° C., a good unagglomerated product is secured. The amount of tall oil to be added in this manner is capable of some variation, being in general, 0.5 to 5 percent by weight of the pigment.

Tall oil is an oil which is derived from the digestion of wood, particularly pine, with caustic. The digestion of this wood results in a saponification and consequent solution of certain acids and other agents in the wood. After digestion, the waste caustic liquor is evaporated until the soaps present become insoluble and grain out. These soaps are then skimmed off, converted to the free acid state and purified. This product is known as tall oil. In general, it contains a large portion of unsaturated constituents, has an acid number of 150–170, a saponification value of 150–170, and is a mixture containing rosin acids, fatty acids, and sterols.

The invention is particularly applicable to the treatment of precipitated carbonate having an average particle size less than one micron and preferably about 0.5 micron. The oil may be incorporated in any convenient manner and it is found desirable to incorporate it while the carbonate is in the form of an aqueous slurry. The slurry may then be filtered and the cake dried at a suitable temperature, for example, above 230° F.

The carbonate may be prepared by various convenient methods. I have found that a carbonate which is particularly adapted to treatment with tall oil may be prepared by precipitation of calcium carbonate with vigorous agitation from a slurry containing calcium hydroxide by means of sodium carbonate in at least a 10 percent excess at a temperature below 45° C. However, other methods may be used. For example, an aqueous slurry of calcium carbonate may be formed by treatment of a slurry of calcium hydroxide with carbon dioxide at a temperature below 40° C.

The following example is illustrative:

A slurry of calcium carbonate was formed by causticizing a slurry containing 110 grams per liter of calcium hydroxide with solid soda ash using 20 percent excess soda ash. The temperature was maintained at 20–35° C. during causticizing. The resulting product was filtered and washed by repulping in water to remove sodium hydroxide and was again repulped in water. This product is finely divided, having an average particle size of about 0.5 micron.

One portion of the slurry was heated to 75° C. and 2.5 percent by weight of tall oil was added and the mixture moderately agitated for 45 minutes during which the temperature of the slurry remained at 75° C. The agitated mixture was then filtered and dried at a temperature of 250° F.

A further portion of the above slurry was treated in an identical manner except that the temperature of the slurry was maintained at 30° C. during incorporation of the tall oil.

Samples of the calcium carbonate prepared as above were compounded with a stock rubber composition used for testing calcium carbonate pigments as rubber reinforcing pigments. The rubber compositions thus prepared were cured in the manner generally used for such tests and the rubber tested for its tensile strength. The following results were secured:

|  | Tensile strength | |
| --- | --- | --- |
|  | Cure 303° F. | Pounds per square inch |
|  | *Minutes* |  |
| Calcium carbonate coated at 30° C | 5 | 3,297 |
|  | 7 | 3,404 |
| Calcium carbonate coated at 75° C | 5 | 3,673 |
|  | 7 | 3,630 |

While the above process has been described with particular reference to the coating of calcium carbonate, it is not limited thereto and may be applied to the treatment of numerous other pigmentary products which have been conventionally coated with oil. For example, lithopone, titanium dioxide, barium sulphate, zinc oxide, calcium silicate, calcium oxalite, zinc sulphate, magnesium carbonate, etc., may be prepared in a finely divided form having an average particle size below one micron and coated with tall oil in an aqueous slurry by the above process, using a temperature of above 50° C. and preferably at least 60° C. for the incorporation.

Although the present invention has been described with reference to the specific details of certain embodiments thereof, it is not intended that such details shall be regarded as limitations upon the scope of the invention except insofar as included in the accompanying claims.

I claim:

1. A method which comprises forming an aqueous slurry of a finely divided pigment having an average particle size not substantially in excess of one micron, adding tall oil thereto while maintaining the temperature of the slurry above 50° C., agitating the mixture to coat uniformly the particles of pigment with the tall oil, filtering the slurry, and drying the product.

2. A method which comprises forming an aqueous slurry of finely divided calcium carbonate having an average particle size not substantially in excess of one micron, adding tall oil thereto while maintaining the temperature of the slurry above 50° C., agitating the mixture to coat uniformly the particles of calcium carbonate with the tall oil, filtering the slurry, and drying the product.

3. A method which comprises forming an aqueous slurry of a finely divided pigment having an average particle size not substantially in excess of one micron, adding tall oil thereto while maintaining the temperature of the slurry at least 60° C., agitating the mixture to coat uniformly the particles of pigment with the tall oil, filtering the slurry, and drying the product.

4. A method which comprises forming an equeous slurry of finely divided calcium carbonate having an average particle size not substantially in excess of one micron, adding tall oil thereto while maintaining the temperature of the slurry at least 60° C., agitating the mixture to coat uniformly the particles of calcium carbonate with the tall oil, filtering the slurry, and drying the product.

5. A method which comprises admixing finely divided calcium carbonate having an average particle size not substantially in excess of one micron with tall oil in an aqueous medium and at a temperature above 50° C., the proportion of oil being sufficient to coat uniformly the particles to prevent substantial agglomeration thereof during drying.

6. A method which comprises admixing a finely divided pigment having an average particle size not substantially in excess of one micron with tall oil in an aqueous medium and at a temperature above 50° C., the proportion of oil being sufficient to coat uniformly the particles to prevent substantial agglomeration thereof during drying.

FREDERICK GAGE.